(12) United States Patent
Poorlupadi et al.

(10) Patent No.: US 10,901,823 B2
(45) Date of Patent: Jan. 26, 2021

(54) SYSTEM AND METHOD FOR LOAD BALANCING IN COMPUTING SYSTEMS

(71) Applicant: Accenture Global Solutions Limited, Dublin (IE)

(72) Inventors: Yashaswi Poorlupadi, Mysore (IN); Veera Venkatasatyanagaganesh Metla, Hyderabad (IN); Chandrashekar Sadashivappa Gunjiganur, Bangalore (IN); Dhireshwar Mishra, Mumbai (IN); Sudhir Kudva, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 271 days.

(21) Appl. No.: 16/228,330

(22) Filed: Dec. 20, 2018

(65) Prior Publication Data

US 2020/0201695 A1 Jun. 25, 2020

(51) Int. Cl.
*G06F 11/00* (2006.01)
*G06F 9/50* (2006.01)

(52) U.S. Cl.
CPC .......... *G06F 11/004* (2013.01); *G06F 9/5083* (2013.01); *G06F 2201/805* (2013.01)

(58) Field of Classification Search
CPC ..... H04L 67/10; H04L 41/5009; H04L 45/12; H04L 41/147; H04L 47/52; H04L 67/1029; G06F 11/3409; G06F 9/505; G06F 9/5083; H04W 28/08; H04W 72/0486

See application file for complete search history.

(56) References Cited

U.S. PATENT DOCUMENTS

| | | | |
|---|---|---|---|
| 6,802,021 B1* | 10/2004 | Cheng | G06F 11/0727 710/316 |
| 8,619,555 B2* | 12/2013 | Dallas | G06F 11/2005 370/228 |
| 9,069,819 B1* | 6/2015 | Kumar | G06F 11/3409 |
| 9,712,290 B2* | 7/2017 | Callaghan | H04L 69/324 |
| 9,787,671 B1* | 10/2017 | Bogrett | H04L 63/08 |
| 10,445,167 B1* | 10/2019 | Young | G06F 11/0772 |
| 10,560,383 B2* | 2/2020 | Song | H04L 47/245 |
| 10,659,366 B1* | 5/2020 | Mehr | H04L 63/0823 |
| 2006/0291400 A1* | 12/2006 | Balasaygun | H04L 65/1009 370/242 |
| 2007/0067296 A1* | 3/2007 | Malloy | H04L 41/145 |
| 2008/0101335 A1* | 5/2008 | Badger | H04L 65/1006 370/352 |

(Continued)

*Primary Examiner* — Loan L. T. Truong
(74) *Attorney, Agent, or Firm* — Plumsea Law Group, LLC

(57) ABSTRACT

A system and method to balance computational loads across multiple computing systems, such as servers in a server cluster, is disclosed. The system includes a load balancer. Upon receiving a new computing request corresponding to an expected throughout, the load balancer identifies a computing system that is most likely to fail and sends the new computing request to a different computing system. The load balancer uses a mutational algorithm to identify potentially problematic throughputs for a given computing system in a given state. The mutational algorithm is used to determine latency-throughput curves that are fit to a data population that includes many diverse data points with relatively high slopes in a 2D latency-throughput space.

20 Claims, 9 Drawing Sheets

(56) References Cited

U.S. PATENT DOCUMENTS

| | | | |
|---|---|---|---|
| 2009/0019094 A1* | 1/2009 | Lashley | G06F 9/5027 |
| 2010/0161852 A1* | 6/2010 | Veni | G06F 11/0727 |
| | | | 710/38 |
| 2011/0138052 A1* | 6/2011 | Caplan | G06F 9/505 |
| | | | 709/226 |
| 2012/0124414 A1* | 5/2012 | Dallas | H04L 67/1097 |
| | | | 714/6.2 |
| 2014/0244631 A1* | 8/2014 | Arthur | G06F 40/30 |
| | | | 707/723 |
| 2015/0181416 A1* | 6/2015 | Dominguez Romero | |
| | | | H04W 76/16 |
| | | | 370/328 |
| 2016/0218979 A1* | 7/2016 | Roh | H04L 43/16 |
| 2016/0353448 A1* | 12/2016 | Korhonen | H04W 8/005 |
| 2017/0139052 A1* | 5/2017 | Skalicky | G01S 19/28 |
| 2017/0317932 A1* | 11/2017 | Paramasivam | H04L 67/02 |
| 2017/0359426 A1* | 12/2017 | Choi | H04L 67/1002 |
| 2017/0366616 A1* | 12/2017 | Rodrigues Nascimento | |
| | | | H04W 4/44 |
| 2018/0032405 A1* | 2/2018 | Chen | G06F 11/0709 |
| 2018/0048587 A1* | 2/2018 | Bai | H04L 67/1051 |
| 2018/0285750 A1* | 10/2018 | Purushothaman | G06N 5/045 |
| 2018/0349236 A1* | 12/2018 | Liu | G06F 9/44526 |
| 2019/0052565 A1* | 2/2019 | Modi | H04L 43/0852 |
| 2019/0146861 A1* | 5/2019 | Joshi | H04L 41/0672 |
| | | | 714/37 |
| 2019/0379587 A1* | 12/2019 | Coutinho | H04L 43/0817 |
| 2020/0201740 A1* | 6/2020 | Peipelman | G06F 11/3457 |

\* cited by examiner

SYSTEM AND METHOD FOR LOAD BALANCING IN COMPUTING SYSTEMS

TECHNICAL FIELD

The present disclosure generally relates to load balancing in computing systems. More specifically, the present disclosure generally relates to a system and method for load balancing new computing requests across multiple computing systems.

BACKGROUND

Load balancing involves distributing computational workloads across different computing systems. This may include distributing incoming server requests across multiple servers in a server cluster. A load balancer may be a software and/or hardware system that selects which server (or servers) within a server cluster will receive new requests.

Load balancers may use different methods of selecting servers that will receive new requests. In a first to respond system, a load balancer may select the server that responds first to an availability request. However, since the selection of a server depends only on the current state of each server in the cluster, this method does not consider the possibility that the selected server could fail upon receiving the new request.

There is a need in the art for a system and method that addresses the shortcomings discussed above.

SUMMARY

The embodiments include systems and methods for load balancing in computing systems. The system uses a mutational algorithm to predict the probability that a computing system (for example, a server) within a cluster of computing systems may fail upon processing an additional amount of throughput (related to computational load). Thus, out of the N competing computing resources in a cluster the one with the least terminal latency to an additional $\Delta t$ throughput will receive the request. More specifically, by using a mutational algorithm, a load balancer can identify potential combinations of throughput and expected latency that drag latency beyond an acceptable tolerance (and thus, where system failure may occur).

The mutational algorithm may help predict the future health of an available computing system, including potential failure, in real-time based on activity/health observed over any period of time. Resources can be scaled up (additional capacity added) when the cumulative predicted health state of all the currently engaged computing systems go beyond the functioning range for any incoming change in throughput. Resources can also be scaled down when the additional throughput is predicted to be safely distributed between the engaged computing systems.

Such a dynamic scaling policy may help reduce the need to preconfigure failure states in systems and allow such systems to develop a more organized load balancing architecture. The tendency of this algorithm to bend the latency-throughput curve towards fail-safety provides such a system with a reserve of resources and buys additional time for scaling up capacity when required.

In one aspect, a method of balancing computational loads across a plurality of computing systems to reduce the likelihood of system failure in one or more of the computing systems is disclosed. The method includes the steps of receiving a new computing request, the new computing request corresponding to a new throughput, calculating a probability of failure for each computing system in the plurality of computing systems, and sending the new computing request to the computing system with the lowest probability of failure. The probability of failure corresponds to the probability that a computing system fails upon processing the new computing request corresponding to the new throughput.

In another aspect, a non-transitory computer-readable medium storing software comprising instructions that are executable by one or more device processors to balance computational loads across a plurality of computing systems by performing steps of receiving a new computing request, the new computing request corresponding to a new throughput, calculating a probability of failure for each computing system in the plurality of computing systems, and sending the new computing request to the computing system with the lowest probability of failure. The probability of failure corresponds to the probability that a computing system fails upon processing the new computing request corresponding to the new throughput.

In another aspect, a system for balancing computational loads across a plurality of computing systems includes a device processor and a non-transitory computer readable medium storing instructions that are executable by the device processor. The instructions are executable to receive a new computing request, the new computing request corresponding to a new throughput. The instructions are also executable to calculate a probability of failure for each computing system in the plurality of computing systems, the probability of failure corresponding to the probability that a computing system fails upon processing the new computing request corresponding to the new throughput. The instructions are also executable to send the new computing request to the computing system with the lowest probability of failure.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features, and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

The embodiments include systems and methods to balance computational loads across multiple computing resources. As used herein, the term "computing resource" may include any physical or virtual systems. These include, but are not limited to: computers, servers, virtual machines, virtual servers, network links (such as routers), and/or any suitable combination of these components. In a system of linked computing resources, such as a cluster of servers, each individual computing resource may also be referred to as a "computing node" (or simply a "node").

Figure 1:
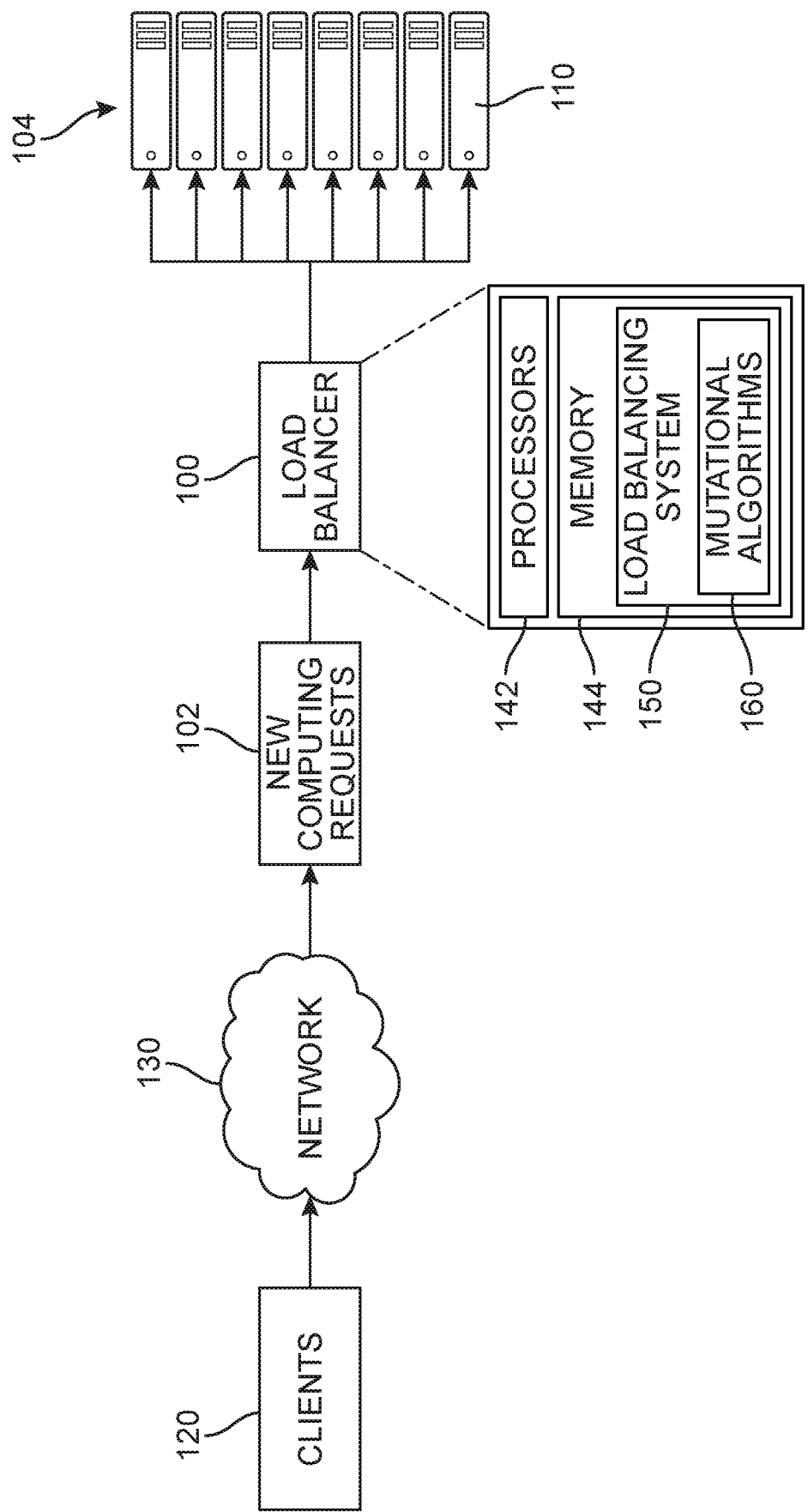
FIG. 1 is a schematic view of a load balancing architecture for a server cluster, according to an embodiment.

FIG. 1 is a schematic view of a system in which new computing requests 102 are received at a load balancer 100 and then distributed to a plurality of computing systems in a cluster 104, according to an embodiment. In the embodiment depicted in FIG. 1, cluster 104 may comprise a server cluster comprised of individual servers 110. Servers 110 could be physical (dedicated hardware) servers or virtual servers. In other embodiments, cluster 104 could be comprised of any other kinds of computing systems.

The type of computing request received at load balancer 100 may depend on the type of resources allocated on cluster 104. In one exemplary embodiment, cluster 104 may be used for cloud hosting services. If the cloud housing services include serving one or more websites, the new computing requests 102 could correspond to HTTP requests, for example. In other contexts, any other kinds of computing requests corresponding to known communication protocols could be received at a load balancer.

Requests may be sent by one or more clients 120 over a network 130. As used herein, the term "client" refers to any computing system or device that makes requests that utilize any computational resources of cluster 104.

Requests may be sent to load balancer 100 over any kind of network. In some embodiments, network 130 may be a wide area network ("WAN"), e.g., the Internet. In other embodiments, network 130 may be a local area network ("LAN"). For example, in a more remote location far from a metropolitan area, the Internet may not be available. In yet other embodiments, network 130 may be a combination of a WAN and a LAN.

Load balancer 100 comprises any hardware and/or software responsible for distributing computational workloads across multiple computing systems. In some embodiments, load balancer 100 comprises at least one processor 142 and memory 144 for storing information, including software information and/or data. Processor 142 may include a single device processor located on a single device, or it may include multiple device processors located on one or more physical devices. Memory 144 may include any type of storage, which may be physically located on one physical device, or on multiple physical devices.

The exemplary system can include load balancing system 150 stored within memory 144. Load balancing system 150 may include any software, processes or services used in receiving computing requests, communicating with one or more computing systems (such as servers), and managing computational loads across one or more computing systems.

Load balancing system 150 may further comprise one or more mutational algorithms 160. Mutational algorithms 160 may comprise any algorithms or processes used to analyze data through steps of initializing data, selecting subsets of data, and transforming (or "evolving") the selected subset of data using one or more "genetic operators".

Load balancer 100 may be in communication with individual nodes of cluster 104. This communication can occur over wired or wireless modes of communication. In some embodiments, load balancer 100 may be connected to each node over a network, such as a local area network. Although not depicted in FIG. 1, in some embodiments two or more nodes within cluster 104 could connected to one another.

Load balancer 100 may incorporate any common features known in the art for use in load balancing. These include load balancing features to manage data persistence through user's sessions, priority activation of standby servers, distributed denial of service (DDoS) attack protection, firewalls, as well as other suitable load balancing features.

Figure 2:
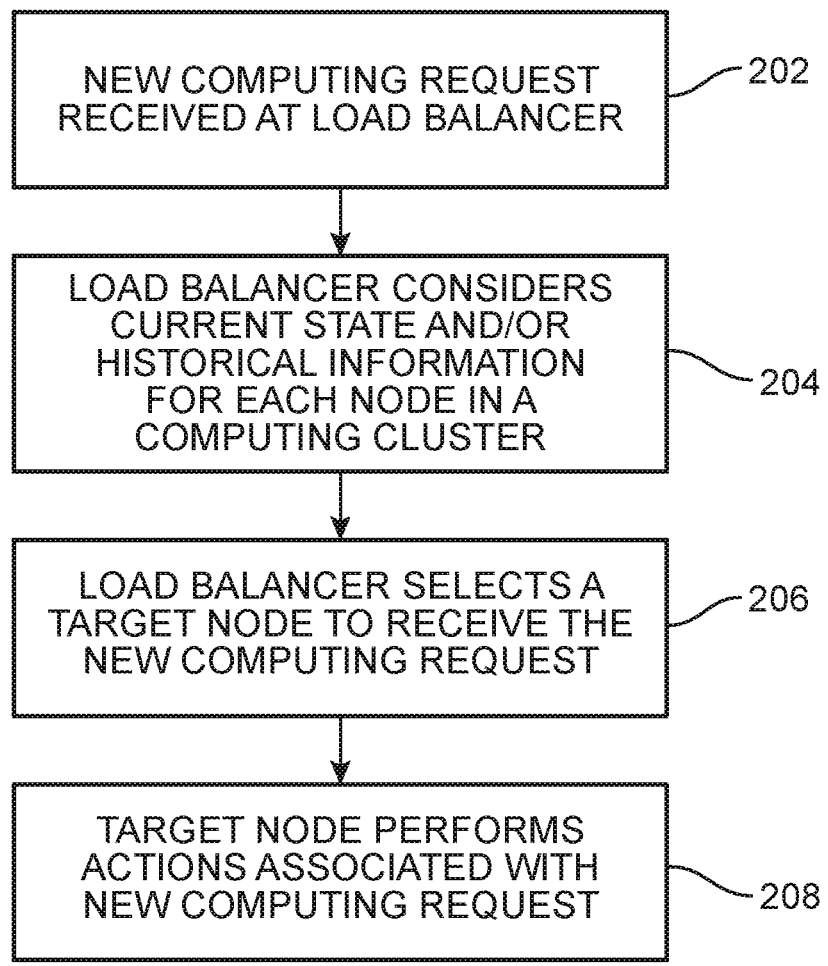
FIG. 2 is a schematic view of a process performed by a load balancer, according to an embodiment.

FIG. 2 depicts a schematic view of the basic operation of the system depicted schematically in FIG. 1. In step 202, load balancer 100 receives new computing requests 102 over network 130 (for example, the internet).

Next, in step 204, load balancer 100 may consider the current state and/or historical information for each node in cluster 104. To retrieve this information, load balancer 100 may query one or more nodes in cluster 104. Alternatively, load balancer 100 could retrieve information from a database that includes historical and/or real-time information for one or more nodes in cluster 104.

Next, in step 206, load balancer 100 selects a target node to receive the new computing request. Specifically, load balancer 100 first determines how to distribute the computational load associated with the incoming request to nodes in the cluster in a manner that optimizes performance and/or safety (that is, minimizing the risk of system failure). As described in further detail below, the exemplary system provides a load balancing method that attempts to minimize the likelihood that a node in a cluster will fail upon taking on the new load corresponding to the new computing request. This may be especially important when receiving requests corresponding to new computational loads that are large compared to typical loads experienced by the system.

In some cases, a load balancer can consider a variety of factors when considering how to distribute computing requests. For example, a load balancer may consider persistence of a user session. In some cases, factors such as persistence could override other factors like expected latency in deciding how to distribute loads. Therefore, in some cases, the set of servers considered for receiving any given request could be smaller than the full cluster.

Upon selecting a target node to receive the new computing request, load balancer 100 may send the new computing request to the target node in step 208. At this point, the target node performs the corresponding computational activity. Additionally, the target node may send a response back to the client (for example, using network 130).

Figure 3:
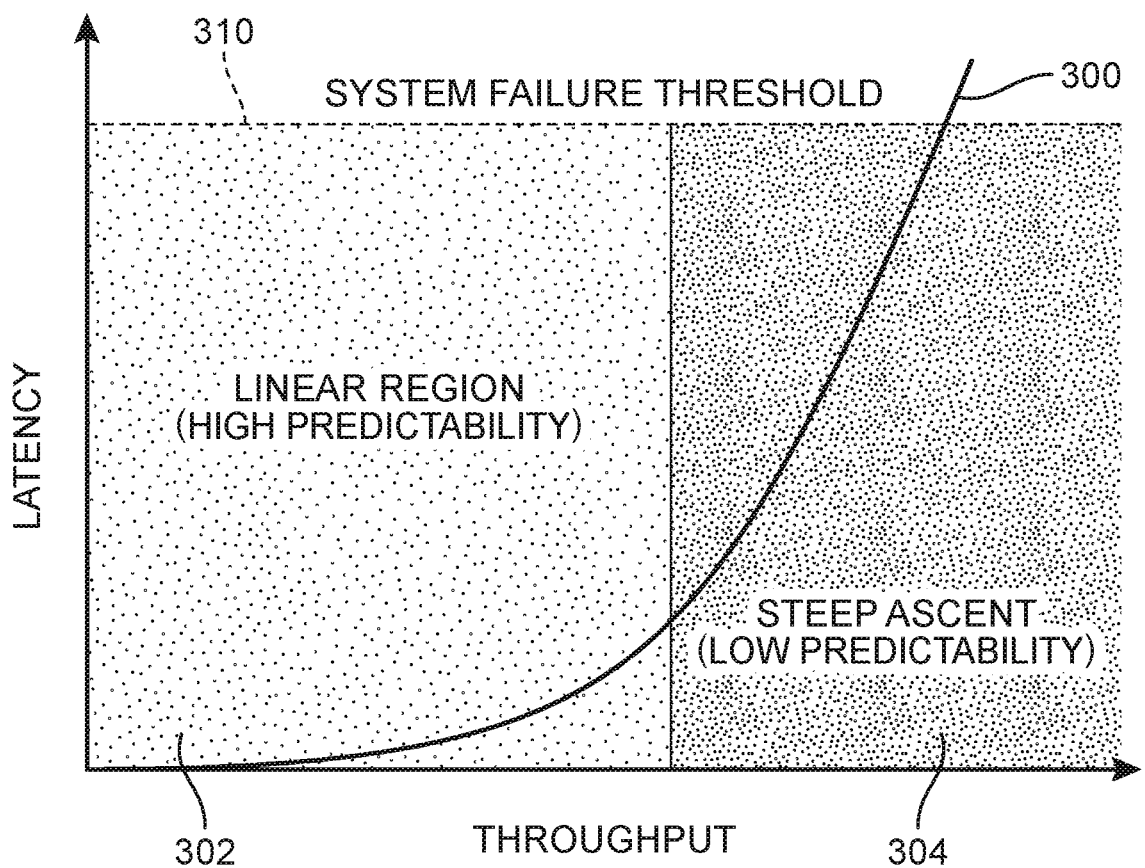
FIG. 3 is a schematic view of a theoretical latency-throughput curve for a computing system, according to an embodiment.

FIG. 3 is a schematic view depicting an idealized relationship between the throughput and latency of a computing system. As used herein, the term "throughput" refers to the number of requests processed over a given period of time. The value of the throughput may vary according to the period of time selected. For example, the throughput could be given as the number of requests per second, per minute or per hour. The throughput represents a measure of the computational load on a computing device. Additionally, the term "latency", as throughout the detailed description and in the claims, refers to the time between making a request and receiving a response (including, possibly, a partial response). Generally, lower latency is associated with higher performance in a computing system and higher latency is associated with lower performance.

Referring to FIG. 3, a latency-throughput curve 300 shows how latency generally increases with increased throughput in a computing system (such as one of servers 110 in FIG. 1). More specifically, latency-throughput curve 300 starts off with a relatively small slope in a linear region 302 and then rises steeply in a steep ascent region 304. As seen in FIG. 3, linear region 302 comprises a region of high predictability, while steep ascent region 304 comprises a region of low predictability. That is, within linear region 302 the latency of the computing system is roughly proportional to the throughout. This means that given an expected throughput (at), the change in latency of the computing system can be predicted with relatively high confidence. By contrast, within steep ascent region 304 the latency of the computing system may change in a nonlinear manner with changes in the throughput, making it much more difficult to predict how latency changes with expected changes in throughput. This is problematic because it is within this steep ascent region 304 that latency-throughput curve 300 approaches the system failure threshold 310. This threshold corresponds to an (approximate) amount of latency where a computing system begins to fail. Such system failures can lead to cascading problems in a cluster of computing systems (such as cluster 104 of FIG. 1).

It should be emphasized that throughput-latency curve 300 is only an idealized relationship. In reality, the relationship may be substantially more complicated. Moreover, for any given system, the exact relationship is unknown and can only be approximated. It is not known a priori at what value of throughput a given computing system will fail. That is, it is not known a priori which throughputs will correspond to latencies at or above the systematic failure threshold.

The embodiments include provisions for identifying discrete points along (or near) a hypothetical latency-throughput curve that are associated with system failure, or within a given tolerance of the system failure threshold and therefore potentially problematic. In the context of genetic algorithms, such points in a data set may be characterized as "mutants", since they correspond to an unhealthy state of a computing system where the latency is above, or sufficiently close to, a system failure point.

As described in further detail below, a mutational algorithm may be used to identify potentially problematic throughputs that could result in latencies near or above the system failure threshold. By identifying potentially problematic throughput-latency data points and fitting a latency function to them, the mutational algorithm can be used to predict computing systems that are most likely to fail upon receiving a computing request and experiencing a given expected change in throughput.

Figure 4:
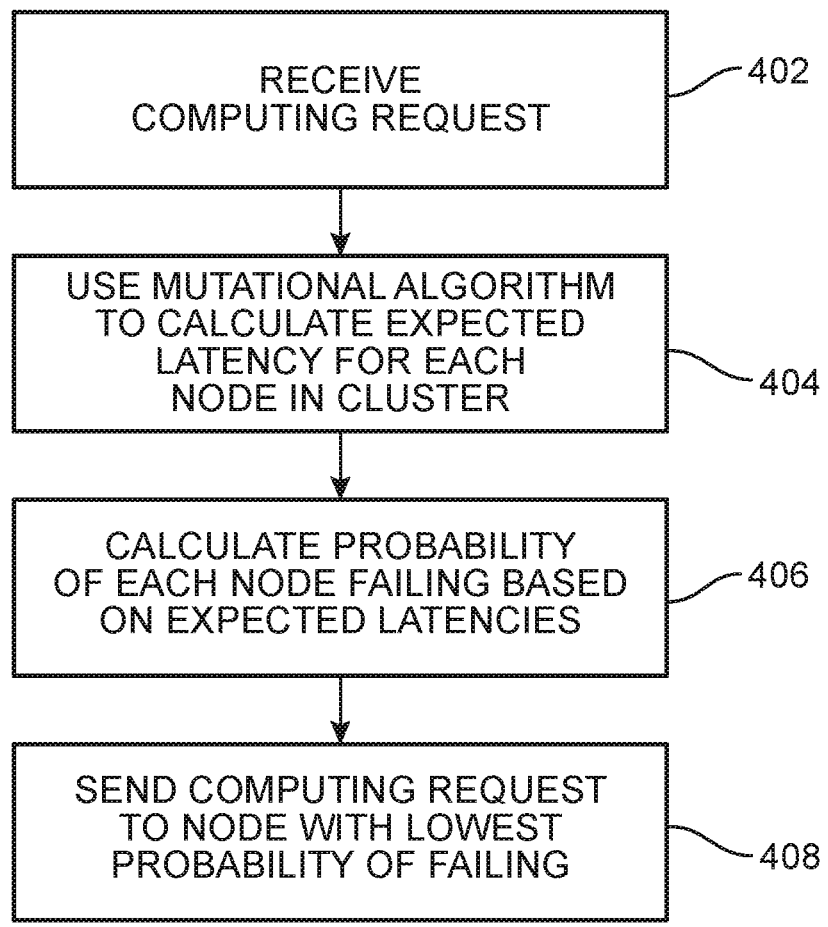
FIG. 4 is a schematic view of a process for predicting a latency-throughput curve for a computing system, according to an embodiment.

FIG. 4 is a schematic view of a process for balancing computational loads in a cluster of computing systems (nodes) in a manner that minimizes the risk of any of the nodes failing, according to an embodiment. For clarity, the embodiment describes each of these steps being performed by a load balancer (such as load balancer 100 of FIG. 1). However it may be appreciated that in other embodiments one or more steps could be performed by other systems.

In step 402, a load balancer may receive a computing request. For example, load balancer 100 may receive an HTML request over the internet. Next, in step 404, the load balancer may use a mutational algorithm to calculate the expected latency for each node in a cluster based on the expected throughput associated with the computing request. For example, load balancer 100 may calculate the expected latency for each of the servers 110 in cluster 104. As described in further detail below, this step may include communicating with the nodes to determine the current state of each node. In some embodiments, the mutational algorithm could include one or more supervised learning steps.

In step 406, the load balancer may calculate the probability of each node failing based on the expected latencies calculated during step 404. Finally, in step 408, the load balancer may send the computing request to the node with the lowest probability of failing.

Figure 5:
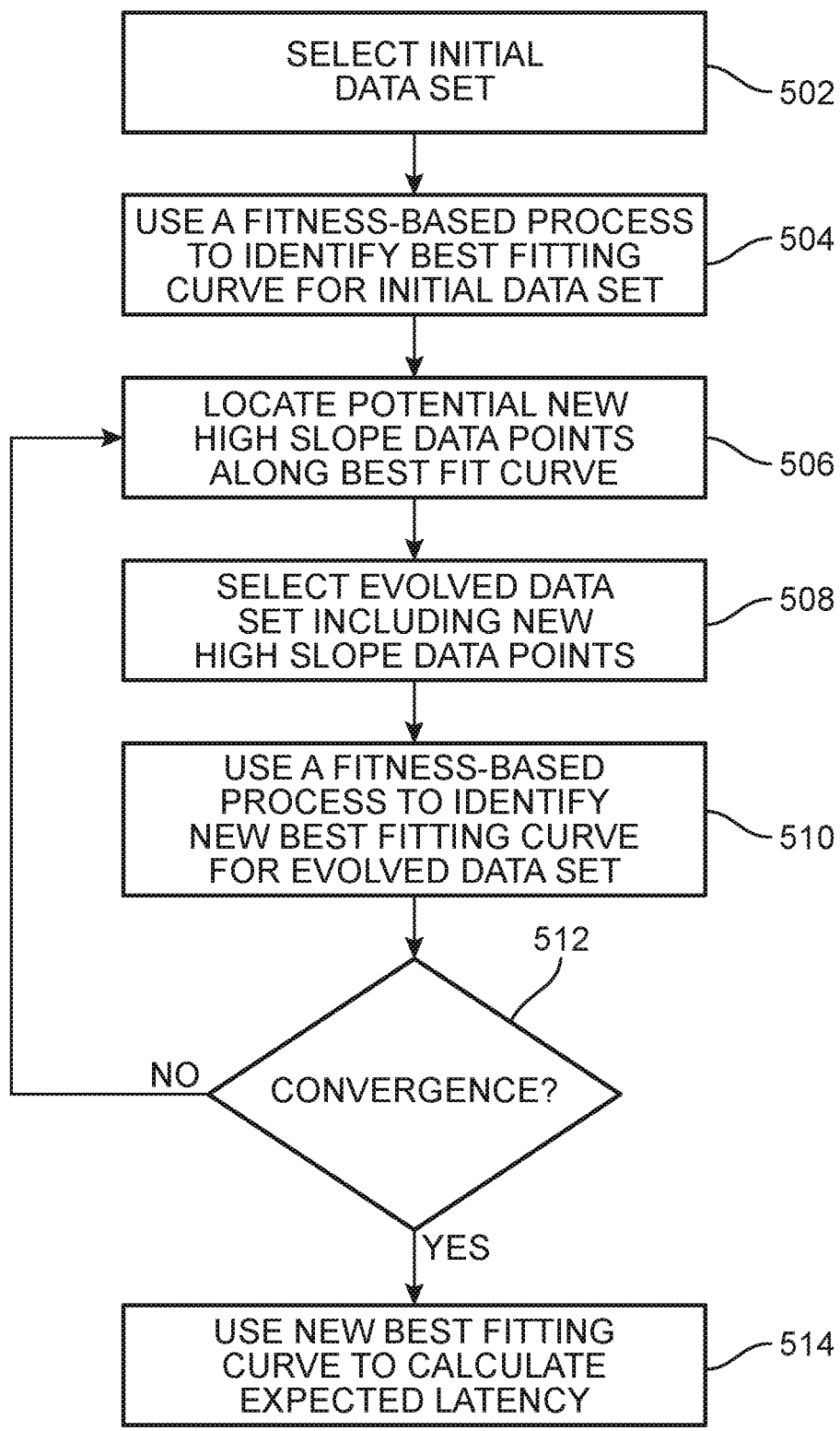
FIG. 5 is a schematic view of a process associated with a mutational algorithm, according to an embodiment.

FIG. 5 is a schematic view of a process for applying a mutational algorithm to latency-threshold data for a computing system to predict expected latency. In some embodiments, some of the steps may be performed by a load balancer (or load balancing system) using mutational algorithms 160 that are stored in memory (see FIG. 1). Moreover, some of the steps described in FIG. 5 are best understood with reference to various graphical relationships, which are depicted in FIGS. 6-8.

In a first step 502, an initial data set may be selected from a preliminary data set. For example, the graphical relationship depicted schematically in FIG. 6 shows a set of data plotted as throughput-latency pairs. This data may correspond to measured throughput-latency data for a given computing system (such as a server in a server cluster).

Figure 6:
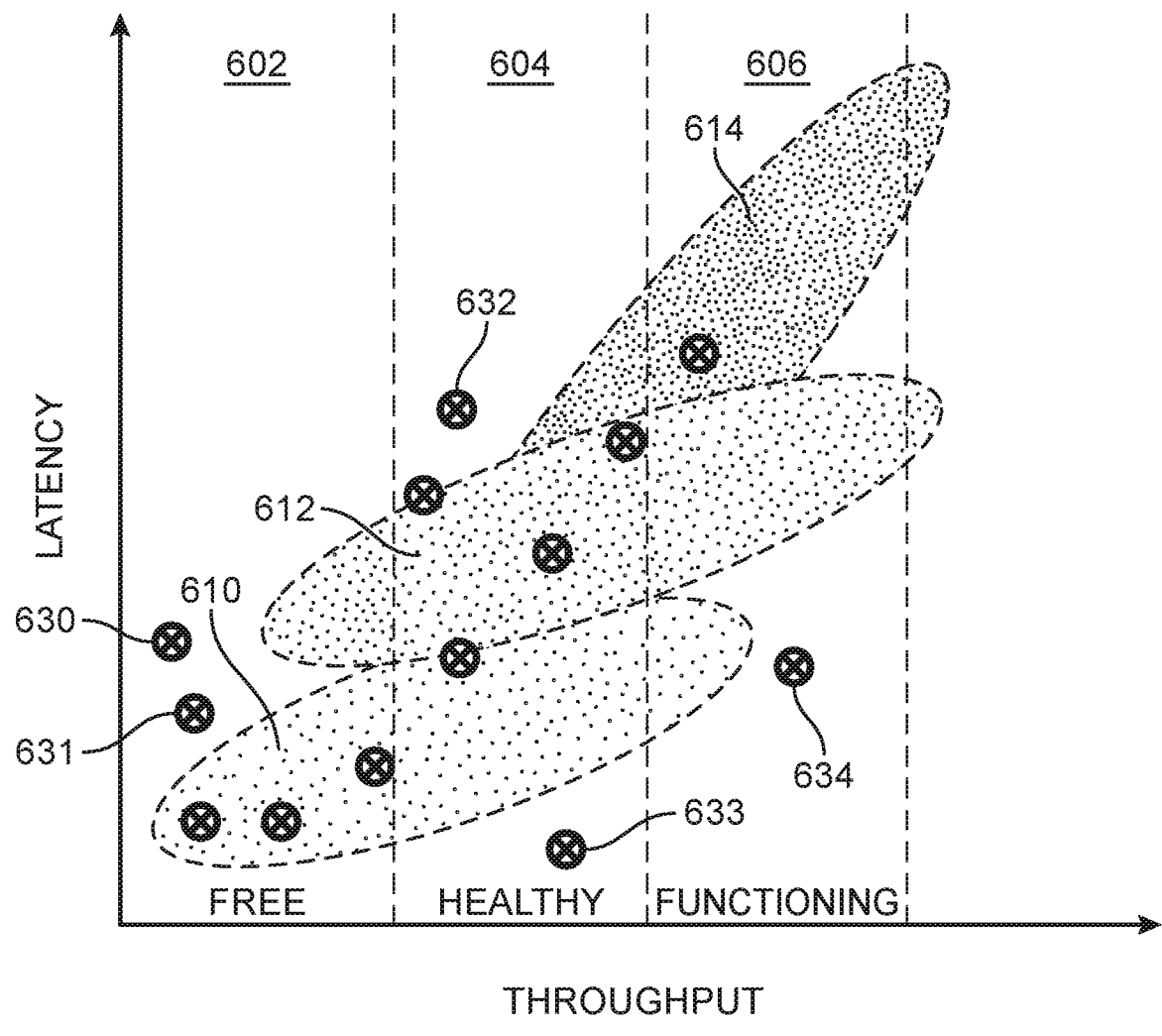
FIG. 6 is a schematic view of a step of selecting initial data from preliminary data as part of a mutational algorithm, according to an embodiment.
Figure 7:
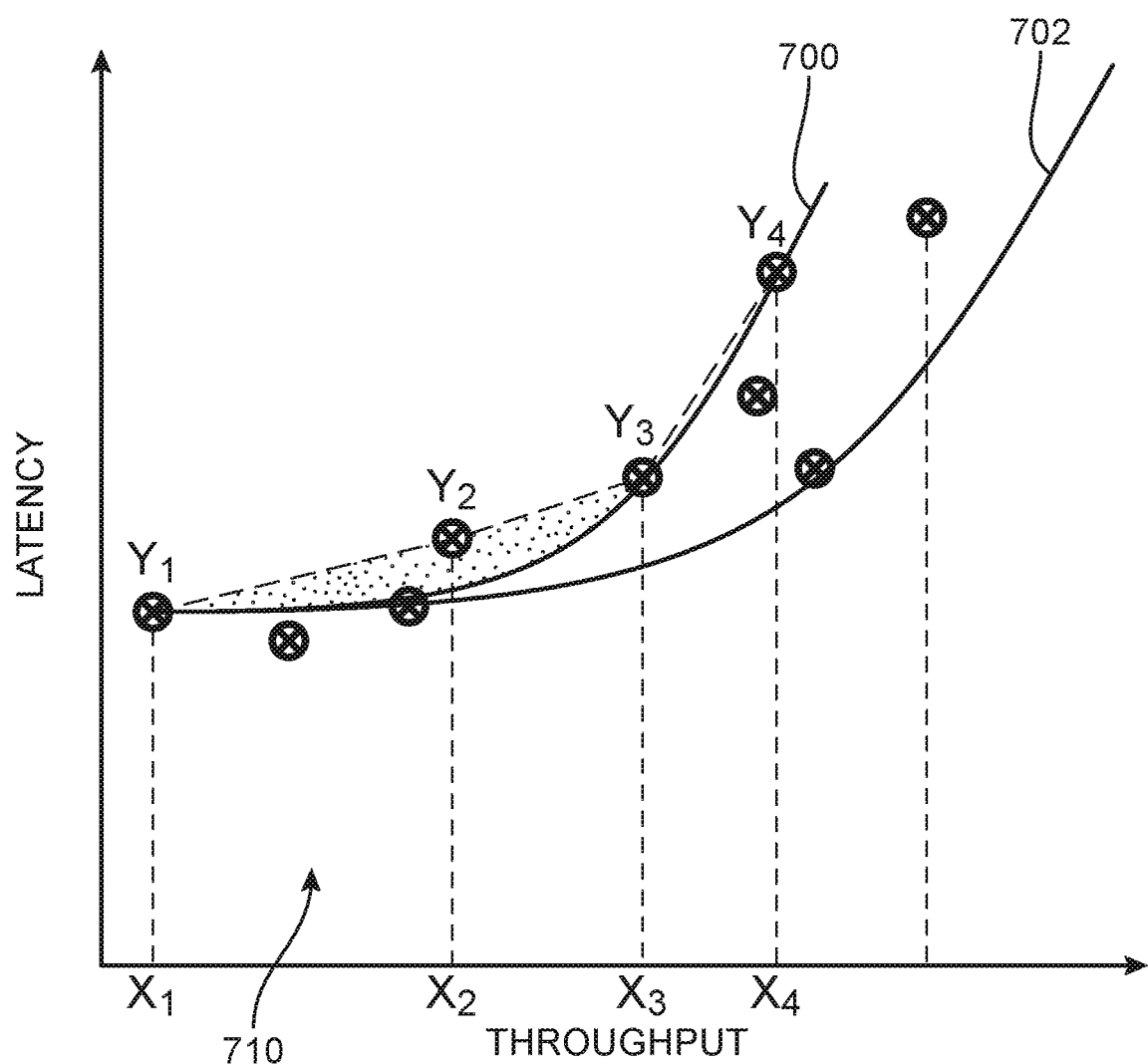
FIG. 7 is a schematic view of a step of determining a best-fit curve for a set of initial data, according to an embodiment.
Figure 8:
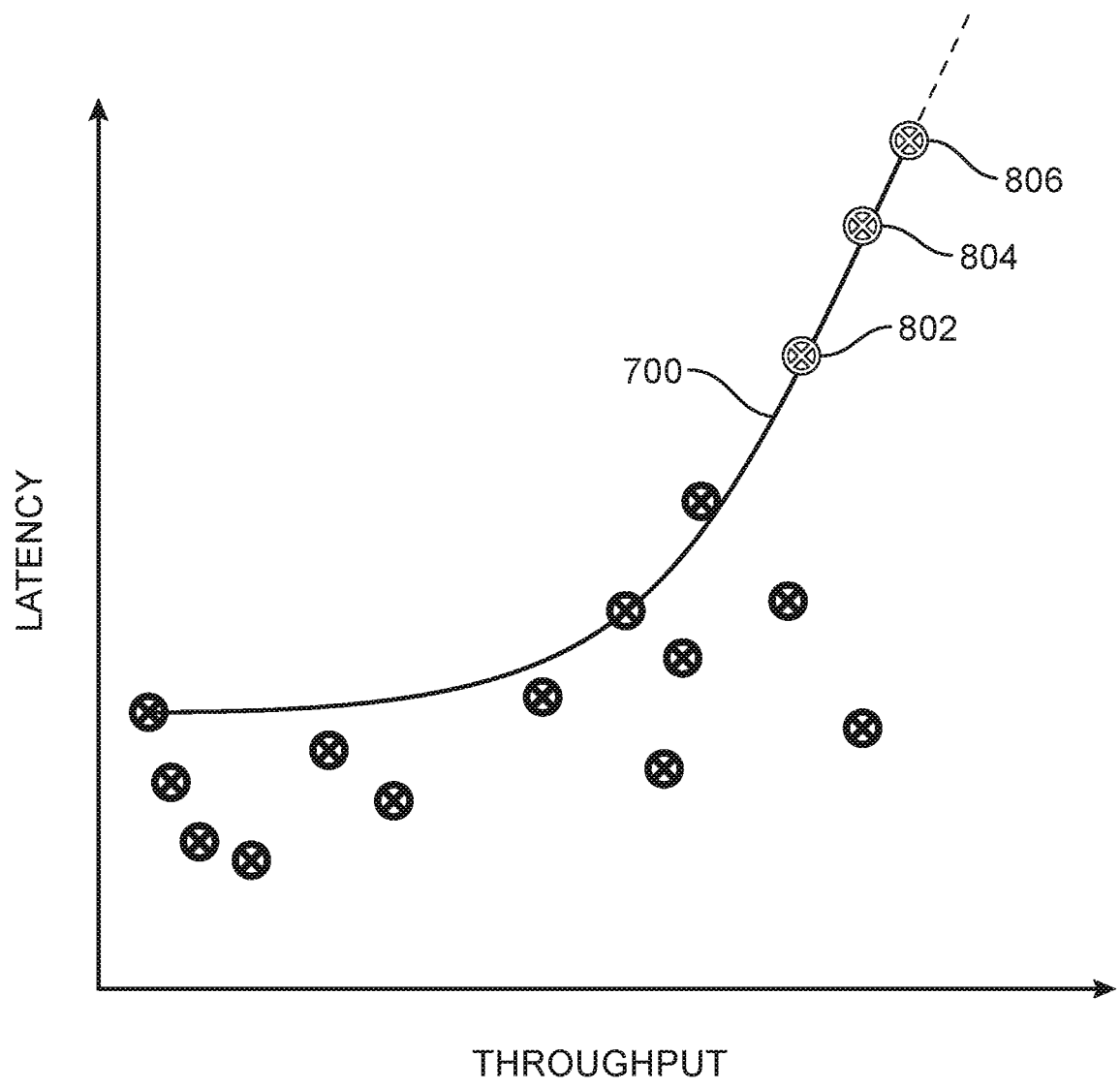
FIG. 8 is a schematic view of a step of identifying potential diverse data points, according to an embodiment.
Figure 9:
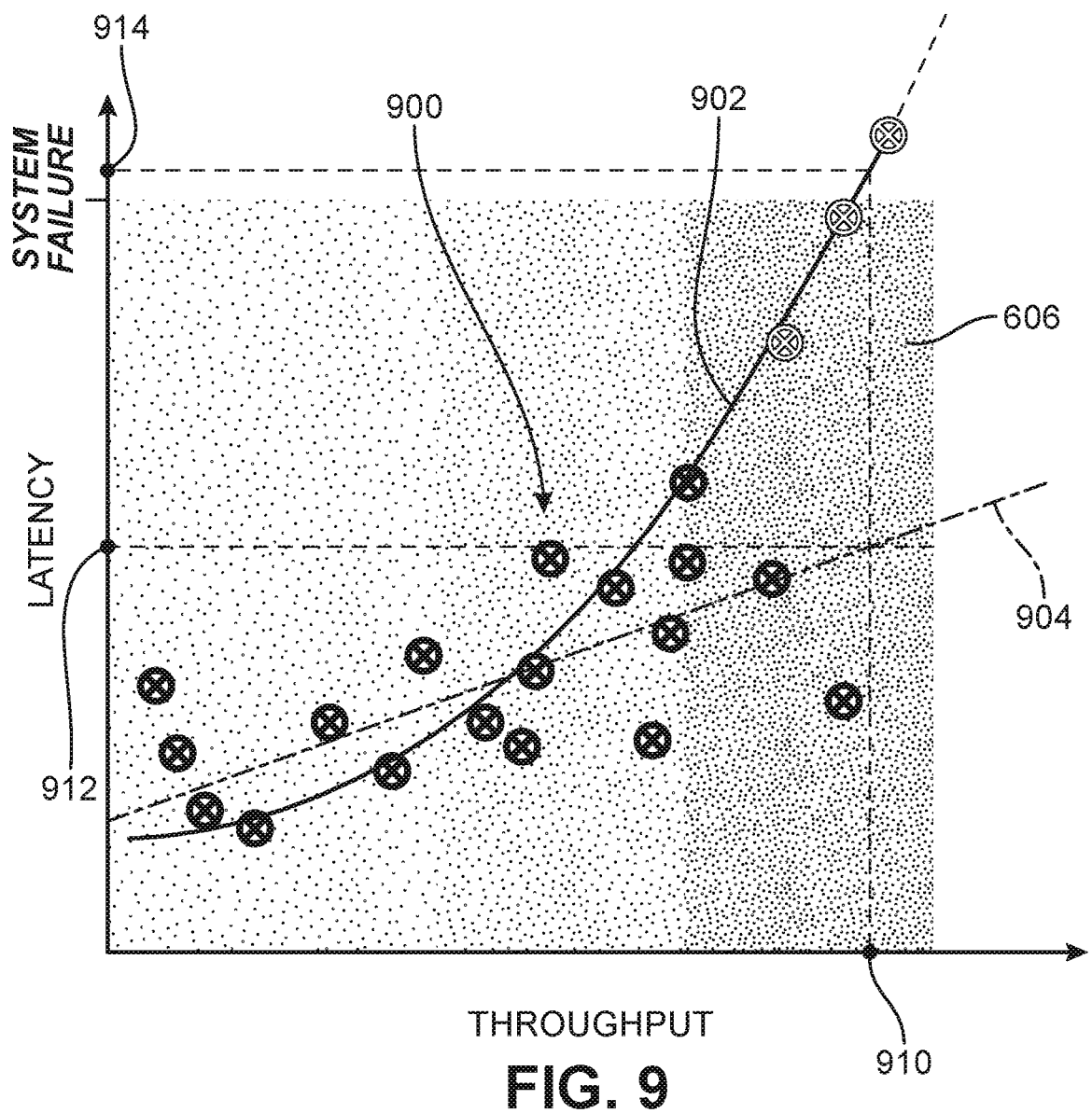
FIG. 9 is a schematic view of two different latency-throughput functions for a given set of data, according to an embodiment.

It may be appreciated that the data set shown in FIG. 6, as well as in FIGS. 7-9, are shown for purposes of clarity and are idealized from real-world data sets. Real-world data sets may generally comprise hundreds, thousands or even millions of data points.

The preliminary data set shows a high degree of spread along both the throughput and latency axes. In particular, the preliminary data do not form a clear curvilinear relationship as is depicted for the hypothetical latency-throughput curve 300 shown in FIG. 3. In order to select an initial data set for analysis (or an initial population in the context of genetic algorithms), a mutational algorithm may include steps or rules for selecting the initial data from the larger preliminary set.

Criteria for selection are based on diversity criteria. In this context, diversity is associated with the severity of the slope assigned to each data point. To maximize diversity, the data are divided into three regions: a free region 602, a healthy region 604 and a functioning region 606. These three regions can be selected using any suitable boundaries along the throughput axis. In one embodiment, free region 602 corresponds to throughputs between 0% and X %, healthy region 604 corresponds to throughputs between X % and (X+20)%, and functioning region 606 corresponds to throughputs between (X+20)% and (X+30)%. Here, X may be any suitable number and could be selected according to heuristic rules for identifying regions where the performance of computing systems tend to degrade.

Within each of these regions, data points are selected according to their slopes (either absolute or relative slopes). Data points data points with lowest slopes are selected in free region 602. Data points with slopes closer to a "mean slope" are selected from healthy region 604. Data points with the highest slopes are selected from functioning region 606.

As an example, FIG. 6 depicts a collection 610 of low slope data points that have been selected from free region 602, a collection 612 of mean slope data points that have been selected from healthy region 604, and a collection 614 of high slope data points that have been selected from functioning region 606. Together, data points from these collections form the initial data set (initial population) used by the mutational algorithm. The remaining data points that do not fall inside of these collections are not included in the initial data set. In FIG. 6, exemplary data points that are not selected include data point 630, data point 631, data point 632, data point 633, and data point 634.

Referring back to FIG. 5, once the initial data set has been selected, a fitness-based process may be used to identify a best fitting curve for the initial data set in step 504. At the broadest level, the fitness-based process is comprised of several sub-processes. These include generating candidate fitting curves, and then selecting the best fit curve according to a set of fitness criteria.

Fitting curves are assumed to have the functional form $f(x)=k+mx^n$. Here, k is the intercept, m is the slope and n is an exponent. x is the independent variable. The goal is to find a curve that fits the data and approximates the theoretical (but unknown) latency-throughput curve. Thus, f(x) is a function to predict the latency as a function of throughput.

Thus, the fitness-based process begins with generating a set of candidate solutions (curves or loci) of the form $k+mx^n$. These curves are attempts to fit the initial population data. Then, the fitness, or fitment, of each of these curves is determined to select the best fit curve.

In some embodiments, the slope and intercept can be determined by assuming discrete linearity of the curve. In some cases, the parameters can obtained using through the least Root Sum of Squares (RSS) of the linear axial distance of the initial population in free and healthy regions from any proposed curve (or locus) i.e., by solving for the parameters (slope and intercept) that give $$\Sigma_{i=1}^{n}(k+mx_i-y_i)^2 \cong 0$$

For the exponent, the fitment is measured by the error spread between the area between the proposed best fit curve and the cumulative area under neighboring data points from the initial population.

The area under the best fit curve can be determined by integration. That is, using $$a_p \cong \int f(x).$$

Assuming, the data set has points with reasonably close proximity, the cumulative area under neighboring data points can be calculated using the following equation:

$$a_T \cong \Sigma_{i=1}^{n} \frac{1}{2}(y_{i+1}+y_i)(x_{i+1}-x_i)$$

The error spread is then determined by minimizing $\Delta a = |a_T - a_p|$.

The error spread is indicated visually in FIG. 7, which depicts an exemplary best fit curve 700. As seen in FIG. 7, the error spread between the best fit curve 700 and the area under neighboring data points is shown as a stippled region. Here, the area under the neighboring data points is calculated for successive trapezoids defined by the neighboring data points. For example, a first trapezoidal area 710 is defined by the vertices (X1, 0), (X1, Y1), (X2,0) and (X2, Y2). The error spread is determined by considering the difference between the area under the best fit curve and the cumulative area of all such trapezoids defined by the neighboring data points.

FIG. 7 also depicts a rejected fit curve 702. For purposes of illustration only a single rejected curve is depicted. But of course the system may generally analyze many more curves to determine a best fit.

After selecting a best fit curve in step 504, an evolutionary step to identify potential new higher slope data points to potentially include in the population is performed in step 506. During this step, the system attempts to find additional data points that may have higher slopes (or higher slopes relative to a local mean slope) than the data points in the current data set. New points may be found by crawling up the current best fit function in incremental steps. The step size could be determined dynamically and based on the expected change in throughput.

In some embodiments, this step of searching for additional data points along the best fit curve may occur in real-time as the load balancer is attempting to calculate expected latency at a given change in throughput for each computing system.

FIG. 8 depicts an example where additional data points have been identified along the best-fit curve 700. These include new data point 802, new data point 804 and new data point 806. These new data points are seen to have relatively high slopes compared to other data points in the initial data set.

New data points that have been identified during step 506 may be selected for inclusion in the data set. The initial data set along with the new data points together comprise an evolved data set. In some embodiments, new data points may simply be added to the existing data set. In other embodiments, a subset of the initial data points and the new data points may be selected using various selection criteria, including any of the selection criteria described above with respect to step 502. In some cases, the amount of diversity any particular new data point brings to the existing population may be identified through the discrete slope in comparison to the initial slope. That is, for any $r^{th}$ new data point, the diversity may be a function of $\Delta y_r / \Delta x_r$.

Next, in step 510, a fitness-based process may be used to identify a new best-fit curve for the evolved data set. In some embodiments, the new best-fit curve for the updated population is found by using the Root Sum of Squares for the slope and intercept. The exponent for the new best fit curve is determined by recursively solving for the area between the proposed curve and neighboring points in the initial population. In some cases, the recursion interval may be readjusted at every iteration as a factor of the current distance from the solution.

In step 512, the system can check for convergence. Convergence may be determined according to any suitable criteria. In some embodiments, convergence is achieved when expected latency for a supplied throughput crosses the system failure threshold. If convergence is not achieved, the process may return to step 506 to locate new potential high slope data points. If convergence is achieved, the process continues to step 514 where the new best fitting curve is used to calculate expected latency.

It may be appreciated that in the processes described above some steps could be performed in real-time (live), which may be referred to as online learning. Other steps could be performed offline. In one embodiment, the selection of initial data from the preliminary data may be performed offline based on historical data. In some embodiments, the initial selection of a best fit curve may also be performed offline using historical data. Historical data could comprise data from any time period. In some cases, historical data could comprise data from the previous day, previous week or other suitable time period. In other embodiments, both selecting the initial data population and finding a best-fit curve through a fitness-based process can be performed live, or online, using real-time data for a given computing system.

In some embodiments, the steps of locating new high slope data points and updating the latency-throughput curve accordingly may be performed live (online). This allows the step-size for crawling up the latency-throughput curve to be determined dynamically according to the expected throughput associated with a new computing request. In addition, this step may be performed to analyze the time to failure of the associated target system.

FIG. 9 depicts a schematic view of exemplary latency-throughput curves for two different fitting algorithms applied to a preliminary data set 900. In this case, a first latency-throughput curve 902 has been found using the mutational algorithm described above. In contrast, second latency-throughput curve 904 has been found using another machine learning algorithm. As seen in FIG. 9, second latency-throughput curve 904 provides a conservative fit of the preliminary data set 900. Specifically, second latency-throughput curve 904 provides a linear approximation of the full data set. Such a fit could be achieved using conventional linear regression techniques, for example. By contrast, first latency-throughput curve 902 provides an aggressive fit that bends towards any extremal data points with relatively high slopes, especially in the functioning region.

The difference in the degree of safety that each fit provides can be understood by considering the expected latencies predicted by each curve at a relatively high throughput value 910. At this throughput value, second latency-throughput curve 904 predicts a latency 912 that has a value well below the system failure tolerance for the computing system. A load balancer attempting to distribute a given computing request may find this expected latency tolerable and pass the request to the computing system even though the underlying data includes some extremal points that are substantially close to the system failure threshold at this level of throughput.

By contrast, at this same throughput value, first latency-throughput curve 902 predicts a latency 914 that is above the system failure tolerance for the computing system. A load balancer attempting to distribute a given computing request would recognize the expected latency as above the system failure threshold and pass the request to a different computing system in the cluster.

Although this example depicts a linear fit for second latency-throughput curve 904, other curves fit by other kinds of non-adaptive machine learning algorithms may also tend to provide average fits to the data. These average fits may drastically underestimate the potential for diverse latency values at various throughputs.

By using a mutational algorithm that evolves to find and select ever more extremal data points (that is, data points with relatively higher slopes at higher throughputs), the system and method produce throughput-latency curves that maximize survivability of each computing system given additional loads/throughputs.

The various machine learning algorithms described above may be implemented using known machine learning software packages and/or frameworks. These include the SciPy library for the Python programming language and the Tensorflow machine learning framework. Specifically, the algorithms described above, including algorithms for implementing least root sum of squares, as well as known evolutionary or genetic algorithms, may be implemented using known software packages.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method of balancing computational loads across a plurality of computing systems to reduce the likelihood of system failure in one or more of the computing systems, the method comprising the steps of:
    receiving a new computing request, the new computing request corresponding to a new throughput;
    calculating a probability of failure for each computing system in the plurality of computing systems, the probability of failure corresponding to the probability that a computing system fails upon processing the new computing request corresponding to the new throughput; and
    sending the new computing request to the computing system with the lowest probability of failure.

2. The method according to claim 1, wherein the new throughput corresponds to a new computational load.

3. The method according to claim 1, wherein calculating the probability of failure includes calculating a latency-throughput function that predicts an expected latency based on an expected throughput.

4. The method according to claim 3, wherein the probability of failure is calculated using the expected latency.

5. The method according to claim 1, wherein calculating the probability of failure includes assuming that at least one of the computing systems in the plurality of computing systems will fail upon receiving the new computational request.

6. The method according to claim 3, wherein calculating the latency-throughput function further comprises:
    retrieving a preliminary data set and selecting an initial data set from the preliminary data set;
    generating a set of curves corresponding to the initial data set and selecting a best fit curve from the set of curves;
    locating at least one additional data point associated with the best fit curve, wherein the at least one additional data point is not already in the initial data set.

7. The method according to claim 6, wherein selecting the initial data set further comprises:
    separating the preliminary data set into a first region, a second region and a third region;
    selecting a first subset of data from the preliminary data in the first region using a first criteria;
    selecting a second subset of data from the preliminary data in the second region using a second criteria; and
    selecting a third subset of data from the preliminary data in the third region using a third criteria.

8. The method according to claim 7, wherein the first criteria, the second criteria, and the third criteria each correspond to different ranges of slopes for the initial data.

9. The method according to claim 6, wherein the set of curves comprise curves of the form $k+mx^p$, wherein k is an intercept, m is a slope, x is an independent variable associated with throughput, and p is an exponent.

10. The method according to claim 9, wherein the intercept and slope are determined by minimizing a root sum of squares function for a set of throughput and latency data points.

11. The method according to claim 9, wherein the exponent is determined by minimizing the difference between an area under a target curve and a cumulative area under a set of data points in the initial data set.

12. The method according to claim 6, wherein locating the at least one additional data point comprises climbing the latency-throughput function in discrete steps.

13. The method according to claim 12, wherein the sizes of the discrete steps are determined according to an expected throughput.

14. A non-transitory computer-readable medium storing software comprising instructions that are executable by one or more device processors to balance computational loads across a plurality of computing systems by:
- receiving a new computing request, the new computing request corresponding to a new throughput;
- calculating a probability of failure for each computing system in the plurality of computing systems, the probability of failure corresponding to the probability that a computing system fails upon processing the new computing request corresponding to the new throughput; and
- sending the new computing request to the computing system with the lowest probability of failure.

15. The non-transitory computer-readable medium according to claim 14, wherein the instructions include instructions associated with a mutational algorithm.

16. The non-transitory computer-readable medium according to claim 15, wherein the mutational algorithm includes a step of selecting initial data from a preliminary set of data, a step of evaluating one or more fitting curves for the initial data, and a step of evolving the initial data.

17. The non-transitory computer-readable medium according to claim 14, wherein calculating the probability of failure includes determining a latency-throughput function from a data set comprising pairs of throughput and latency values.

18. A system for balancing computational loads across a plurality of computing systems, the system comprising:
- a device processor; and
- a non-transitory computer readable medium storing instructions that are executable by the device processor to:
  - receive a new computing request, the new computing request corresponding to a new throughput;
  - calculate a probability of failure for each computing system in the plurality of computing systems, the probability of failure corresponding to the probability that a computing system fails upon processing the new computing request corresponding to the new throughput; and
  - send the new computing request to the computing system with the lowest probability of failure.

19. The system according to claim 18, wherein the system is a load balancing device.

20. The system according to claim 18, wherein the plurality of computing systems comprise a cluster of servers.

* * * * *